3,420,839
AMINOMETHYL PYRAZOLONE DERIVATIVES OF NICOTINAMIDE

Feriano Banci and Ezio Tubaro, Rome, Italy, assignors to Stabilimenti Chimico-Farmaceutici Dr. R. Ravasini & C. ia S.p.A., Rome, Italy, a corporation of Italy
No drawing. Filed June 10, 1966, Ser. No. 556,562
Claims priority, application Italy, July 1, 1965, 14,623/65; May 12, 1966, 10,857/66
U.S. Cl. 260—295.5    6 Claims
Int. Cl. C07d 57/00

ABSTRACT OF THE DISCLOSURE

Novel derivatives of nicotinamide are provided which are prepared by the aminomethylation reaction of nicotinamide. The products show improved pharmacological characteristics and properties in comparison with previous drugs. As analgesic, antipyretic and anti-inflammatory drugs, the novel products are superior to previous analogous drugs. Furthermore, the novel products show also antihistaminic, anticonvulsive, sedative, anti-bradykinin and so-called anti-slow actions.

---

This invention relates to some new derivatives of nicotinamide which have particular pharmacological characteristics, to a method for their preparation, and to their use in the treatment of diseases.

This series comprises some sharply analogous compounds which can be defined as aminomethyl-derivatives of nicotinamide.

They can be represented by the following general formula:

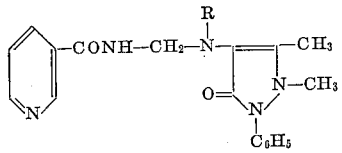

wherein R represents an alkyl group having from 1 to 6 carbon atoms including straight and branched chains, or R is an arylalkyl group which may or may not have some substituents in the aromatic nucleus; the substituents present may be halogen, hydroxy or methoxy groups.

We have now discovered that these nicotinamide derivatives with an alkylamino- or arylalkylamino-antipyrine represent a considerable improvement in comparison with analogous known compounds, because, besides the improvement of some characteristics, they have a surprisingly wider spectrum of biological activity.

In therapeutics, compounds with a pyrazole ring, having an antipyretic, anti-inflammatory action, have been known for a long time (for example, aminopyrine, phenylbutazone) or they have been introduced more recently (for example, nicotinamido - antipyrine: Arzneimittel Forschung 9, 132—1959). Such drugs however, besides having an activity lower than that of the compounds of this invention, as it appears from the comparative tables, have a higher degree of toxicity, principally evident in chronic toxicity.

Furthermore, the products according to this invention have (and this is surprising) new properties which are characteristic of the fundamental claimed structure, and which can be summarized as follows: antihistaminic action, anticonvulsive action, hypnogenic and sedative action, action against biological liquids produced in vivo by phlogistic agents (cf. Experientia XXI, 34—1965).

In the comparative tables, among the products corresponding to the above reported general formula, we have chosen, as a typical representative term of the series, the compound wherein R is an isopropyl group:

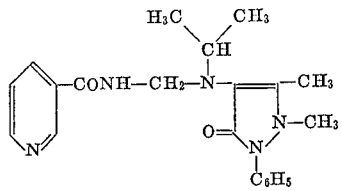

which, at present, is the compound which we prefer, and which for sake of brevity, is indicated in this specification by the abbreviation Ra 101.

It should be considered, however, that we have made the relative experiments and tests, reported in the tables, also with the other products of the series according to the invention, and we have obtained analogous, although quantitatively different, results.

The following tables give, in a synthetic manner, a representation of the properties of the preferred compound Ra 101, in comparison with known substances having similar effects; after every table, a brief explanatory note follows about the experimental conditions, and the results.

TABLE 1.—ANTIPYRETIC EFFECT

| Compound | Dose, g./kg. | Number of animals | Average decrease of temperature in ° C. after 4½ hrs. |
|---|---|---|---|
| Ra 101 | 0.100 | 10 | −1.69 |
| Aminopyrine | 0.100 | 10 | −1.32 |
| Phenylbutazone | 0.100 | 10 | −0.80 |
| Nicotinamido-antipyrine | 0.100 | 10 | −0.67 |

The experiments were carried out with rabbits, after hyperthermization from injection of bacterial lipopolysaccharides produced by *Escherichia coli*.

The substances were administered intramuscularly.

From Table 1 it appears that the antipyretic effect of Ra 101 is considerably higher than that of the known substances aminopyrine, phenylbutazone and nicotinamido-antipyrine.

TABLE 2.—ANALGESIC POWER
[Fiducial limits for a probability of 19/20]

| Compound | Dose, mg./kg. | Analgesic dose 50* of ethylmorphine |
|---|---|---|
| Ra 101 | 100 | 34.5 (20.6–57.9) |
| Aminopyrine | 100 | 54.0 (34.9–83.7) |
| Nicotinamido-antipyrine | 100 | 81.0 (49.1–133.6) |
| Phenylbutazone | 100 | 80.0 (50.0–132.5) |
| Ethyimorphine | | 73.0 (43.4–122.6) |

*The analgesic power is determined as enhancement of analgesia from ethylmorphine by the hot plate method according to Eddy, N. B., et al. (J. Pharmacol. Exp. Ther. 107, 385—1953).

From Table 2 it appears that the analgesic power of Ra 101 is considerably higher than that of the known substances aminopyrine, phenylbutazone and nicotinamido-antipyrine.

TABLE 3.—ANALGESIC POWER*
[Fiducial limits for a probability of 19/20]

| Compound | Dose, mg./kg. | Time, seconds |
|---|---|---|
| Ra 101 | 300 | 19.7 (15.9–23.5) |
|  | 200 | 14.6 (9.8–19.4) |
|  | 100 | 10.1 (7.8–12.4) |
| Aminopyrine | 300 | 15.0 (9.8–20.2) |
|  | 200 | 10.3 (5.3–15.3) |
|  | 100 | 6.35 (4.5–8.1) |
| Nicotinamido-antipyrine | 300 | 10.3 |
|  | 200 | 9.9 |
|  | 100 | 8.1 |
| Controls | | 7 |

*The method of Randall and Selitto was used, modified as follows: intraperitoneal administration of the compounds to female Wistar rats; after one hour, subplantar injection of carrageenin 1% and stimulation by a hot plate. The response, expressed in seconds, is reported in the table.

Also from Table 3 it appears that the analgesic power of Ra 101 is considerably higher than that of aminopyrine and of nicotinamido-antipyrine.

TABLE 4.—ANTI-INFLAMATORY ACTIVITY ON EDEMA FROM CARRAGEENIN

| Compound | Dose, mg./kg. | Percent inhibition in comparison with controls |
|---|---|---|
| Ra 101 | 400 | 71.3 |
|  | 300 | 35.2 |
|  | 200 | 17.0 |
| Aminopyrine | 400 | 62.5 |
|  | 300 | 31.5 |
|  | 200 | 14.0 |
| Nicotinamido-antipyrine | 400 | 8.3 |
|  | 300 | 6.5 |
|  | 200 | 4.6 |

The compounds were administered by mouth one hour before a subplantar injection of carrageenin (0.05 ml. 1% solution) to rats. For every compound an average of 10 animals were used. The foot volume was measured in comparison with that of control rats.

Table 4 shows that the anti-inflammatory activity of Ra 101 is higher than that of aminopyrine, and particularly than that of nicotinamido-antipyrine.

TABLE 5.—HYPNOGENIC EFFECT, EXPRESSED AS ENHANCEMENT* OF THE EFFECT OF HEXOBARBITOL (N - METHYL - Δ - CYCLOHEXENYL-METHYL-BARBITURIC ACID)

[Fiducial limits for a probability of 19/20]

| | Dose, mg./kg., intraperitoneally | Sleep time, minutes |
|---|---|---|
| Control | | 77 (67.6-86.4) |
| Ra 101 | 125 | 169.5 (94.9-244.1) |
|  | 250 | 300.9 (218.1-383.6) |
|  | 500 | 416.5 (356.6-476.5) |

*The enhancement is expressed as a prolongation of the sleep time caused by 100 mg./kg. of hexobarbital in mice, intraperitoneally.

Table 5 shows, very clearly, that Ra 101 has an enhanced hypnogenic effect.

Table 6 shows, very clearly, that the toxicity of Ra 101 for white rats is much lower than that of aminopyrine.

TABLE 7.—LETHAL DOSE 50 ($LD_{50}$) (CHRONIC) ACCORDING TO BEAUWILLAIN FOR SWISS WHITE RATS; INTRAPERITONEAL ADMINISTRATION

[Time: 21 days. Doses are expressed in g./kg.]

| Aminopyrine | 0.255 (0.216-0.301) | Toxicity rate |
|---|---|---|
| Ra 101 | 0.697 (0.524-0.927) | $\frac{\text{Ra 101}}{\text{Aminopyrine}} = \frac{0.679}{0.255} = 2.7$ |

Also Table 7 shows that the toxicity of Ra 101 is much lower than that of aminopyrine.

TABLE 8.—ENHANCEMENT OF THE ANTIHISTAMINE ACTION OF DIPHENHYDRAMINE

[Protective dose 50 ($PD_{50}$), mg./kg.]

| Diphenhydramine +250 mg./kg. Ra 101 | Diphenhydramine +125 mg./kg. Ra 101 | Diphenhydramine |
|---|---|---|
| 0.25 (0.167-0.375) | 0.43 (0.37-0.602) | 0.97 (0.75-1.26) |

The doses reported in Table 8 represent the amount of diphenhydramine, alone or with Ra 101, which protects 50% of guinea pigs for 15 minutes to an aerosol of histamine solution (2 mg./ml.).

The antihistaminic effect of Ra 101 is evident from Table 8. In the same conditions aminopyrine, phenylbutazone, nicotinamido-antipyrine and nicotinamide have no effect.

TABLE 9.—ANTIHISTAMINE ACTION ON THE CONTRACTION OF ISOLATED GUINEA PIG ILEUM TREATED BY 1 γ/ML. OF HISTAMINE

| | Efficient dose 50 ($ED_{50}$), γ/ml. |
|---|---|
| Ra 101 | 238(172-328) |

As $ED_{50}$ it is intended the dose which inhibits by 50% the contraction of ileum caused by histamine. Also from Table 9 the antihistamine effect of Ra 101 is clear; aminopyrine, nicotinamido-antipyrine, nicotinamide and phenylbutazone, at the doses of Ra 101, have no activity.

TABLE 10.—ANTIHISTAMINIC ACTION

[Response of the isolated guinea pig ileum to varied doses of histamine, alone or in th presence of constant amounts of Ra 101]

| Histamine, γ/ml. | Contraction of ileum, caused by histamine, mm. | Contraction of ileum, caused by histamine + 250 γ/ml. of Ra 101, mm. | Percent reduction of contraction | Contraction of ileum, caused by histamine + 500 γ/ml. of Ra 101, mm. | Percent reduction of contraction |
|---|---|---|---|---|---|
| 0.05 | 13.7±2.86 | 2.0±2.62 | 85.4 | 0 | 100 |
| 0.1 | 22.4±2.76 | 10.6±9.92 | 52.7 | 3±2.16 | 86.6 |
| 0.2 | 32.1±3.72 | 20.4±7.99 | 36.4 | 12.5±3.72 | 61.1 |
| 0.4 | 40.4±3.21 | 30.1±8.12 | 25.5 | 21.5±3.89 | 46.8 |
| 0.6 | 45.8±3.30 | 35.0±10.69 | 23.6 | 28.0±2.70 | 38.9 |
| 0.8 | 48.1±3.30 | 38.4±10.38 | 20.2 | 31.9±3.30 | 33.7 |
| 1.0 | 52.3±3.11 | 43.6±10.38 | 16.6 | 35.5±7.96 | 32.1 |

TABLE 6.—DISTRIBUTION OF MORTALITY IN WISTAR WHITE RATS AFTER DAILY ADMINISTRATION OF 0.250 G./KG. OF THE COMPOUND, INTRAPERITONEALLY

| Compound | Time, days | Percent of mortality |
|---|---|---|
| Aminopyrine | 12 | 50 |
|  | 18 | 100 |
| Ra 101 | 14 | 9.1 |
|  | 18 | 18.2 |
|  | 23 | 27.3 |
|  | 32 | 45.4 |

Also, Table 10 shows the evident antihistamine effect of Ra 101, since doses of 250 or 500 γ/ml. of Ra 101 reduce considerably the contraction of the isolated guinea pig ileum. In the graph (semilogarithmic scale) representing said contraction as a function of the histamine doses, the points of each curve (that of histamine alone and that of histamine plus either dose of Ra 101) are a line, and they define three right lines of action characterized by a small deviation of parallelism.

The ten above tables show clearly the outstanding analgesic, antipyretic, anti-inflammatory and antihistaminic properties of the novel compound Ra 101. Similar results were obtained also with the other compounds of the present invention, which are specified infra in this description, and in the claims.

Preparation method

The preparation of the compounds according to the invention is carried out by reacting under the infra described conditions, nicotinamide with formaldehyde and a secondary amine corresponding to the following general formula:

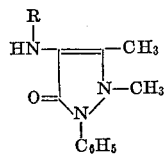

wherein R has the above stated meaning and particularly it may be isopropyl, sec-butyl, isobutyl, 1-(1-methyl)butyl, 1-(1-ethyl)propyl, 1-(2-ethyl)butyl.

Such secondary amines can be prepared as described by A. Skita et al. (Ber. 75B, 1696—1942), or by known general methods of alkylation of amines.

The reaction according to the invention between nicotinamide, formaldehyde and the secondary amine can be carried out in water or in organic solvents, for example methyl, ethyl, propyl alcohols, etc.

Formaldehyde can be used as an aqueous solution or under the form of a polymer which generates monomeric formaldehyde in situ during the reaction.

The reaction temperature can be varied from 20° C. up to the boiling temperature of the used solvent, anyway not above 100° C.

We have found also that particularly high yields of very pure products can be obtained (A) when the reaction is carried out in a medium at a pH level of 8–10, and preferably of 9, as obtained by means of alkaline buffers e.g. alkaline phosphates and preferably by means of sodium bicarbonate, and (B) when a molar ratio between nicotinamide, formaldehyde and the secondary amine of 1.5:1.5:1 is used. Such preferable conditions are reported in Example 8 but it should be understood that they can be applied also to the other compounds of the invention.

The following examples serve to illustrate each obtained product and the preparation process according to this invention; it should be understood, however, that such examples are only an illustration of the invention, both as to product as well as to the process, since slight variations, easily performable by the experts in the art, can be made to the following examples without coming out from the scope of the invention.

Example 1.—1-phenyl-2,3-dimethyl-4-(N-nicotinamidomethyl-N-isopropyl)amino-5-pyrazolone 15 ml. of an aqueous formaldehyde 40% solution is added to a solution of 0.05 mole 1-phenyl-2,3-dimethyl-4-isopropylamino-5-pyrazolone and 0.05 mole nicotinamide in 30 ml. ethyl alcohol. The mixture is heated for 2 hours at 70° C. After cooling, it is diluted with 100 ml. water and the separated product is collected. The product obtained by crystallization from ethanol-water melts at 165–166° C.

*Analysis.*—Calcd. for $C_{21}H_{25}N_5O_2$: C, 66.47; H, 6.64; N, 18.46. Found: C, 66.36; H, 6.70; N, 18.25

Example 2

The product of Example 1 can also be prepared by dissolving 0.04 mole nicotinamide in 30 ml. water, adding 12 ml. aqueous 40% formaldehyde and refluxing for 1 hour. Then, the mixture is cooled to 50° C., 0.04 mole of the amine is added, and the mixture is heated for two hours more at 70° C.

After cooling, the product which separated during the reaction is collected and is recrystallized from ethanol-water. It is identical to that of Example 1.

Example 3

One can attain the product of Examples 1 and 2 also by operating as follows. 4.8 grams trioxymethylene is added to a solution of 0.04 mole of the amine in 40 ml. ethyl alcohol and is refluxed for 30 minutes. The mixture is slightly cooled, 0.04 mole nicotinamide is added, and the whole is kept at 70° C. for 2 hours. Thereafter, it is diluted with water up to complete precipitation of the product, which when recrystallized from water-ethanol is identical to that described in Examples 1 and 2.

Example 4.—1-phenyl-2,3-dimethyl-4-(N-nicotinamidomethyl-N-sec-butyl)amino-5-pyrazolone 12 ml. of an aqueous 40% formaldehyde solution is added to a solution of 0.04 mole 1-phenyl-2,3-dimethyl-4-sec-butylamino-5-pyrazolone and 0.04 mole nicotinamide in 30 ml. methyl alcohol.

The mixture is refluxed for 3 hours and is diluted with water up to the complete precipitation of the product which is thereafter collected and recrystallized from ethanol-water and ethyl acetate. It melts at 126–127° C.

*Analysis.*—Calcd. for $C_{22}H_{27}N_5O_2$: C, 67.15; H, 6.92; N, 17.80. Found: C, 67.35; H, 7.07; N, 17.57.

Example 5.—1-phenyl-2,3-dimethyl-4-[N-nicotinamidomethyl-N-1-(1-ethyl)propyl]amino-5-pyrazolone By operating as in Example 1 and using 1-phenyl-2,3-dimethyl - 4 - (1-ethyl)-propylamino-5-pyrazolone as the amine, a product is obtained which is recrystallized from ethanol-water and then from ethylacetate-ligroin. It melts at 124–125° C.

*Analysis.*—Calcd. for $C_{23}H_{29}N_5O_2$: C, 67.79; H, 7.17; N, 17.19. Found: C, 67.79; H, 7.31; N, 17.01.

Example 6.—1-phenyl-2,3-dimethyl-4-(N-nicotinamidomethyl-N-isobutyl)-amino-5-pyrazolone 0.02 mole 1 - phenyl - 2,3-dimethyl-4-isobutylamino-5-pyrazolone and 0.02 mole nicotinamide are dissolved in 20 ml. ethyl alcohol; 6 ml. aqueous 40% formaldehyde is added and the mixture is heated at 70° C. for 2 hours.

Under vigorous stirring, the mixture is diluted with water up to the complete precipitation of the product which is then recrystallized from dimethylformamide-water and ethylacetate-ligroin: melting point 136–137° C.

*Analysis.*—Calcd. for $C_{22}H_{27}N_5O_2$: C, 67.15; H, 6.91; N, 17.79. Found: C, 66.95; H, 6.80; N. 17.60.

Example 7.—1-phenyl-2,3-dimethyl-4-[N-nicotinamidomethyl-N-1-(2-ethyl)butyl]amino-5-pyrazolone By operating as in Example 6 and using 1-phenyl-2,3-dimethyl - 4 - (2-ethyl)-butylamino-5-pyrazolone as the amine, the title product is obtained; it melts at 118–120° after recrystallization from dimethylformamide-water.

*Analysis.*—Calcd. for $C_{24}H_{31}N_5O_2$: C, 68.38; H, 7.41; N, 16.62. Found: C, 68.25; H, 7.20; N, 16.35.

Example 8

366 grams nicotinamide, 3.7 grams potassium carbonate and 290 ml. aqueous 35% formaldehyde are dissolved in 1900 ml. water. The mixture is heated to 90° C. and kept at this temperature for 1 hour. Thereafter, 102 grams $NaHCO_3$ and 490 grams 1-phenyl-2,3-dimethyl-4-isopropylamino-5-pyrazolone are added and the whole is kept at 80° C. for 3 hours. After some time, the separation of the product (white needles) begins; it is substantially complete after 3 hours. It is cooled, filtered and the product abundantly washed with water. Lastly, it is dried at 60° C. under vacuum.

In a series of runs carried out as above, the yield of the product 1 - phenyl - 2,3-dimethyl-4-(N-nicotinamidomethyl-N-isopropyl)amino-5-pyrazolone was of 680–700 grams; melting point 165–166° C.

*Analysis.*—Calcd. for $C_{21}H_{25}N_5O_2$: C, 66.47; H, 6.64; N, 18.46. Found: C, 66.33; H, 6.55; N, 18.39.

Applications of the products in the invention

The products of this invention have been found to be efficient in the treatment of all cases when the patient needs analgesic, antipyretic, anti-inflammatory and/or antihistaminic action. The products can be administered in suitable pharmaceutical forms, for example, alone, mixed with suitable excipients as starch, talcum, etc. in tablet, sugar-coated pill, and suppository form, etc.

We have studied (and continue to study) the synergical effect of the compounds of the invention with other known products, as for example diphenhydramine.

Particularly, our product Ra 101, because of its versatile properties, can lend itself to various therapeutical indications, both alone as well as in suitable associations for which a synergism is found.

Alone, Ra 101 can be used in tablet, sugar-coated pill, suppository form, etc. with physiologically suitable excipients.

Because of its enhancing effect on antihistamine drugs, a composition can be useful against diseases from cold wherein Ra 101 is associated, e.g., to diphenhydramine. The ratio by weight Ra 101:diphenhydramine can range from 200:1 to 50:1, the ratio 100:1 being preferred.

In the case that the treatment may require it, a stimulant, e.g. caffeine, can be added.

Example 9

In this example, a method is described for preparing tablets which contain each 400 mg. Ra 101, besides excipients.

Ra 101 _____grams__ 400
Starch _____do____ 40
5% ethylalcoholic ethylcellulose solution _____ml__ 160 are kneaded.

The kneaded mass is passed through a screen having 9 mesh per square cm., is partially dried at 35° C. and is passed through another screen having 121 mesh per square cm.

Starch _____grams__ 40
Talcum _____do____ 8
Magnesium stearate _____do____ 12 are added to the above granulated mixture, mixed and composed with a suitable punch to obtain 1000 tablets containing 400 mg. Ra 101 each.

Example 10

Ra 101 _____grams__ 400
Diphenhydramine _____do____ 4
Caffeine _____do____ 40
Starch _____do____ 45
Gum arabic 25% aqueous solution _____ml__ 200 are kneaded.

A granulated mixture is prepared, firstly by passing through a screen having 9 mesh per square cm., by partially drying and by passing again through a screen having 121 mesh per square cm.

Starch _____grams__ 45
Magnesium stearate _____do____ 13
Talcum _____do____ 5 are added to the above granulated mixture, and, after mixing, are compressed with a suitable punch to obtain 1000 tablets each containing the following active substances:

Ra 101 _____mg___ 400
Diphenhydramine _____mg___ 4
Caffeine _____mg___ 40

What is claimed is:
1. A chemical synthetic compound having the following general formula:

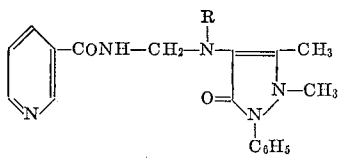

wherein R represents an alkyl group having from 1 to 6 carbon atoms including straight and branched chains.

2. 1-phenyl-2,3-dimethyl-4-(N-nicotinamidomethyl-N-isopropyl)amino-5-pyrazolone, having the following formula:

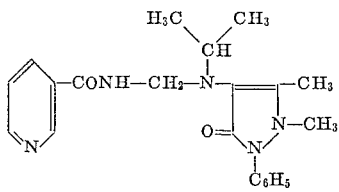

3. 1-phenyl-2,3-dimethyl-4-(N-nicotinamidomethyl-N-sec butyl)amino-5-pyrazolone, having the following formula:

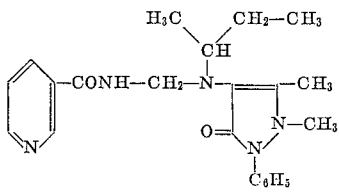

4. 1-phenyl-2,3-dimethyl-4-[N-nicotinamidomethyl-N-1-(1-ethyl)-propyl]amino-5-pyrazolone, having the following formula:

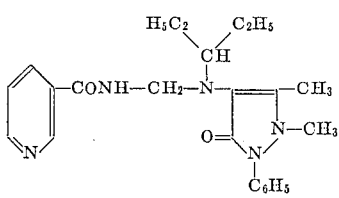

5. 1-phenyl-2,3-dimethyl-4-(N-nicotinamidomethyl-N-isobutyl)amino-5-pyrazolone, having the following formula:

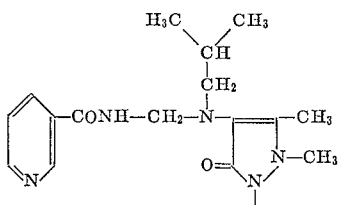

6. 1-phenyl-2,3-dimethyl-4-[N-nicotinamidomethyl-N-1-(2-ethyl)butyl]-amino-5-pyrazolone, having the following formula:

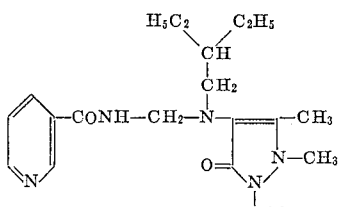

(References on following page)

References Cited

UNITED STATES PATENTS 3,197,473   7/1965   Klosa _____ 260—287

OTHER REFERENCES

Burger, Medicinal Chemistry, Interscience, 2nd ed. (1960) p. 42.

HENRY R. JILES, *Primary Examiner.*

A. L. ROTMAN, *Assistant Examiner.*

U.S. Cl. X.R.

260—310; 424—263